US011820849B2

(12) United States Patent
Jeon et al.

(10) Patent No.: US 11,820,849 B2
(45) Date of Patent: Nov. 21, 2023

(54) METHOD OF PREPARING ABS GRAFT COPOLYMER AND METHOD OF PREPARING THERMOPLASTIC RESIN COMPOSITION

(71) Applicant: LG CHEM, LTD., Seoul (KR)

(72) Inventors: Heejung Jeon, Daejeon (KR); Geon Soo Kim, Daejeon (KR); Changhoe Kim, Daejeon (KR); Hyung Joon Kim, Daejeon (KR); Minsu Chae, Daejeon (KR)

(73) Assignee: LG Chem, Ltd., Seoul (KR)

( * ) Notice: Subject to any disclaimer, the term of this patent is extended or adjusted under 35 U.S.C. 154(b) by 874 days.

(21) Appl. No.: 16/630,830

(22) PCT Filed: Feb. 14, 2019

(86) PCT No.: PCT/KR2019/001793
§ 371 (c)(1),
(2) Date: Jan. 13, 2020

(87) PCT Pub. No.: WO2019/164176
PCT Pub. Date: Aug. 29, 2019

(65) Prior Publication Data
US 2020/0140597 A1 May 7, 2020

(30) Foreign Application Priority Data

Feb. 26, 2018 (KR) .................... 10-2018-0023042
Dec. 21, 2018 (KR) .................... 10-2018-0167193

(51) Int. Cl.
| | | |
|---|---|---|
| C08F 279/04 | (2006.01) | |
| C08F 285/00 | (2006.01) | |
| C08F 6/22 | (2006.01) | |
| C08L 55/02 | (2006.01) | |
| C08F 2/22 | (2006.01) | |
| C08F 6/18 | (2006.01) | |

(52) U.S. Cl.
CPC .............. *C08F 279/04* (2013.01); *C08F 2/22* (2013.01); *C08F 6/18* (2013.01); *C08F 6/22* (2013.01); *C08F 285/00* (2013.01); *C08L 55/02* (2013.01); *C08L 2207/53* (2013.01)

(58) Field of Classification Search
CPC ............ C08F 6/18; C08F 6/22; C08F 285/00; C08F 279/02; C08F 279/04; C08L 55/02
See application file for complete search history.

(56) References Cited

U.S. PATENT DOCUMENTS

| | | |
|---|---|---|
| 2009/0118393 A1 | 5/2009 | Yoo et al. |
| 2010/0048816 A1* | 2/2010 | Ryu .................. C08F 285/00 525/71 |
| 2016/0075813 A1 | 3/2016 | Niessner et al. |

FOREIGN PATENT DOCUMENTS

| | | |
|---|---|---|
| CN | 101654501 A | 2/2010 |
| CN | 101700544 A | 8/2017 |
| KR | 10-1991-0002472 B1 | 4/1991 |
| KR | 10-0184705 B | 12/1998 |
| KR | 1019970021100 | 5/1999 |
| KR | 1020030076475 A | 9/2003 |
| KR | 10-2008-0017780 A | 2/2008 |
| KR | 10-2009-0108774 A | 10/2009 |
| KR | 2009108774 A * | 10/2009 |
| KR | 10-2010-0023463 A | 3/2010 |
| KR | 20100023463 A | 3/2010 |
| KR | 10-2008-0017780 | 12/2011 |
| KR | 101225559 B1 | 1/2013 |
| KR | 20130054907 A | 5/2013 |
| KR | 20130078367 A | 7/2013 |
| KR | 10-2013-0082429 | 7/2015 |
| KR | 10-2015-0144795 A | 12/2015 |
| KR | 20160032668 A | 3/2016 |

OTHER PUBLICATIONS

Machine translation of KR20080017780 (Year: 2023).*
Korean Notification for KR 10-2018-0167193; 9 pages.
First Office Action for Chinese Patent Application No. 201980003592. 3: dated Jan. 5, 2022; 8 pages.
Search Report dated Jul. 6, 2020 for European Application No. 19757280.3.

* cited by examiner

*Primary Examiner* — Irina S Zemel
*Assistant Examiner* — Jeffrey S Lenihan
(74) *Attorney, Agent, or Firm* — Morgan, Lewis & Bockius LLP

(57) ABSTRACT

The present invention relates to a method of preparing an ABS graft copolymer and a method of preparing a thermoplastic resin composition including the ABS graft copolymer. More specifically, the present invention relates to a method of preparing an ABS graft copolymer, in which a predetermined amount of a vinyl aromatic compound and a predetermined amount of a vinyl cyanide compound are grafted to a small-diameter rubber latex before enlarging particle size of the small-diameter rubber latex is performed, and then enlarging particle size of the small-diameter rubber latex is performed by adding a certain amount of a polymer coagulant, and to a method of preparing a thermoplastic resin composition including the ABS graft copolymer. According to the present invention, latex stability may be improved, and an ABS graft copolymer having excellent impact resistance may be prepared.

12 Claims, 1 Drawing Sheet

[FIG. 1]
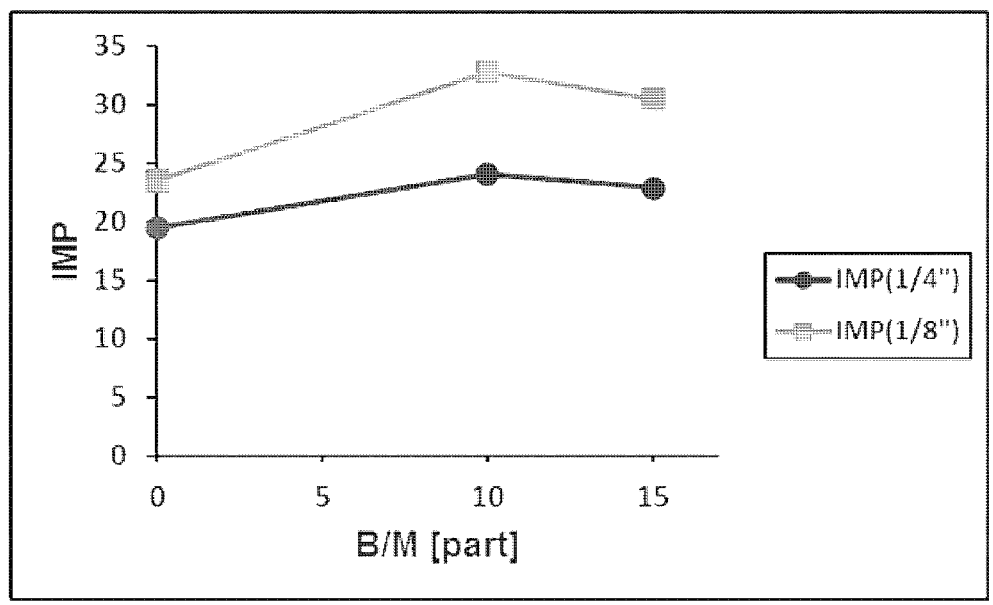
[FIG. 2]
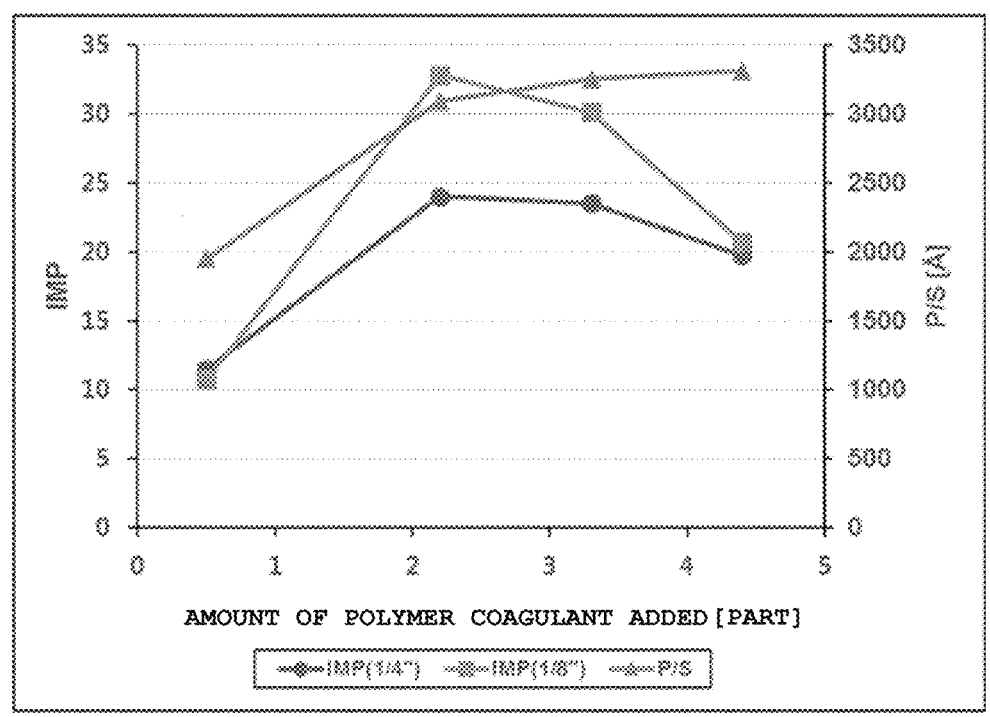

METHOD OF PREPARING ABS GRAFT COPOLYMER AND METHOD OF PREPARING THERMOPLASTIC RESIN COMPOSITION

CROSS-REFERENCE TO RELATED APPLICATIONS

This application is a National Phase entry of International Application No. PCT/KR2019/001793, filed on Feb. 14, 2019, which claims priority to Korean Patent Application No. 10-2018-0023042, filed on Feb. 26, 2018, and Korean Patent Application No. 10-2018-0167193, re-filed on Dec. 21, 2018, based on the priority of the above patent, in the Korean Intellectual Property Office, the disclosures of each of which are incorporated herein by reference.

TECHNICAL FIELD

The present invention relates to a method of preparing an ABS graft copolymer and a method of preparing a thermoplastic resin composition including the ABS graft copolymer. More specifically, the present invention relates to a method of preparing an ABS graft copolymer, in which some of the total amount of a vinyl aromatic compound to be grafted and some of the total amount of a vinyl cyanide compound to be grafted are grafted to a small-diameter rubber latex in advance, and then enlarging the particle size of the small-diameter rubber latex is performed by adding a certain amount of a polymer coagulant, thereby improving stability, productivity, and impact resistance.

BACKGROUND ART

ABS copolymers typified by acrylonitrile-butadiene-styrene have excellent physical properties such as impact resistance, mechanical strength, moldability, and gloss, and are therefore used in manufacture of various articles including electrical and electronic parts, office equipment, automobile parts, and the like.

In general, in preparation of an ABS copolymer, a butadiene rubber latex is prepared, and then styrene and acrylonitrile are grafted thereto. In this case, physical properties of the graft copolymer, such as impact resistance, mechanical strength, and gloss, may be significantly affected by the average particle diameter, particle size distribution, dispersed state, and coagulum content of the rubber polymer latex.

In particular, a key technology for preparation of a high-impact ABS copolymer is to adjust the average particle diameter of a polybutadiene rubber latex (PBL) core to 3,000 to 3,500 Å. In general, the PBL is prepared by an emulsion polymerization method, which is advantageous for control of particle diameter. For example, the above-mentioned large-diameter PBL may be prepared by enlarging the particle size of a small-diameter PBL (1,000 to 1,500 Å) prepared by emulsion polymerization, or may be directly prepared by emulsion polymerization.

Large-diameter PBLs directly prepared by emulsion polymerization have an advantage in terms of impact resistance due to the narrow particle size distribution and low coagulum content thereof. However, the average particle diameter of a rubber latex is closely related to emulsion polymerization time, and a reaction of 30 hours or more is required to obtain a large-diameter PBL. Accordingly, process efficiency may be lowered.

Therefore, a method of adding additives such as vinyl cyanide monomers during emulsion polymerization and a method of shortening reaction time by continuously feeding an emulsifier have been proposed, but the effect thereof is insignificant. In addition, when polymerization reaction temperature is increased to increase reaction rate, other problems such as decrease in latex particle diameter and increase in coagulum content may be encountered.

On the other hand, a method of enlarging the particle size of a small-diameter PBL can halve reaction time, thereby improving productivity. However, in this method, an acid (e.g., acetic acid) is generally used as a coagulant (i.e., particle size enlarging agent), which may cause some problems. For example, in the case of acetic acid, it is difficult to add acetic acid, pH adjustment is required, and a large amount of coagulum is generated.

Therefore, a method of enlarging the particle size of a small-diameter PBL using a polymer coagulant (latex coagulant) has been proposed, and technology for applying the polymer coagulant to improve the impact resistance and gloss of an ABS copolymer needs to be developed.

PRIOR ART DOCUMENT

[Patent Document] KR 10-1225559 B1

DISCLOSURE

Technical Problem

Therefore, the present invention has been made in view of the above problems, and it is one object of the present invention to provide a method of preparing an ABS graft copolymer having high productivity and excellent impact resistance by securing latex stability by using a polymer coagulant.

It is another object of the present invention to provide a method of preparing a thermoplastic resin composition including the ABS graft copolymer prepared using the preparation method of the present invention.

The above and other objects of the present invention can be achieved by the present invention described below.

Technical Solution

In accordance with one aspect of the present invention, provided is a method of preparing an ABS graft copolymer including a first graft polymerization step of grafting 4 to 15% by weight of vinyl monomers to 20 to 70% by weight of a conjugated diene rubber latex; a latex coagulation step of enlarging particle size of the rubber latex by adding a polymer coagulant after the first graft polymerization step; and a second graft polymerization step of grafting 25 to 75% by weight of the vinyl monomers to the rubber latex which the particle size is enlarged, after the latex coagulation step, wherein the polymer coagulant is added in an amount of 1 to 4 parts by weight based on 100 parts by weight in total of the conjugated diene rubber latex and the vinyl monomers; the vinyl monomers include a vinyl aromatic compound and a vinyl cyanide compound; and the rubber latex which the particle size is enlarged has an average particle diameter of 2,800 to 5,000 Å.

In accordance with another aspect of the present invention, provided is a method of preparing a large-diameter rubber latex including grafting 6 to 25 parts by weight of vinyl compounds to 100 parts by weight (based on solids) of a conjugated diene rubber latex; and enlarging particle size of the rubber latex by adding 1 to 4 parts by weight of a polymer coagulant, wherein the vinyl compounds include a vinyl aromatic compound and a vinyl cyanide compound; the rubber latex which the particle size is enlarged has an average particle diameter of 2,800 to 5,000 Å; and coagulum content is 0.05% by weight or less.

In accordance with yet another aspect of the present invention, provided is a method of preparing a thermoplastic resin composition including kneading and extruding 20 to 80% by weight of the ABS graft copolymer according to the present invention and 20 to 80% by weight of a non-graft resin.

Advantageous Effects

According to the present invention, when an ABS graft copolymer is prepared, some of the total amount of a vinyl aromatic compound to be grafted and some of the total amount of a vinyl cyanide compound to be grafted are grafted to a small-diameter rubber latex before performing coagulation of the small-diameter rubber latex, and then enlarging the particle size of the rubber latex is performed by adding a certain amount of a polymer coagulant. Therefore, compared with a latex coagulation process using a conventional polymer coagulant, the method of the present invention can improve productivity due to excellent process efficiency, and the ABS graft copolymer prepared using the method of the present invention has excellent physical properties.

In particular, the present invention can provide an ABS graft copolymer having excellent impact resistance without deteriorating inherent physical properties of the ABS graft copolymer.

In addition, the thermoplastic resin composition prepared using the ABS graft copolymer of the present invention has high gloss characteristics and excellent impact strength.

DESCRIPTION OF DRAWINGS

FIG. 1 is a graph showing changes in impact strength depending on the contents of vinyl monomers, which are grafted to a rubber polymer before addition of a polymer coagulant.

FIG. 2 is a graph showing changes in physical properties depending on the amount of a polymer coagulant added.

BEST MODE

Hereinafter, the method of preparing an ABS graft copolymer according to the present invention will be described in detail.

According to the present invention, when an ABS graft copolymer is prepared, some of the total amount of a vinyl aromatic compound to be grafted and some of the total amount of a vinyl cyanide compound to be grafted are grafted to a small-diameter conjugated diene rubber latex before a coagulant is added to the small-diameter conjugated diene rubber latex, enlarging particle size is performed by adding a certain amount of a polymer coagulant, and then a residual amount of the vinyl aromatic compound and a residual amount of the vinyl cyanide compound are grafted to the rubber latex which the particle size is enlarged. The present inventors have confirmed that, when an ABS graft copolymer is prepared in this manner, coagulation efficiency, productivity, and impact strength are improved as compared with a conventional coagulation process. Based on these findings, the present inventors have completed the present invention.

The method of preparing an ABS graft copolymer of the present invention includes a first graft polymerization step of grafting 4 to 15% by weight of vinyl monomers to 20 to 70% by weight of a conjugated diene rubber latex; a latex coagulation step of enlarging particle size of the rubber latex by adding a polymer coagulant after the first graft polymerization step; and a second graft polymerization step of grafting 25 to 75% by weight of the vinyl monomers to the rubber latex which the particle size is enlarged, after the latex coagulation step, wherein the polymer coagulant is added in an amount of 1 to 4 parts by weight based on 100 parts by weight in total of the conjugated diene rubber latex and the vinyl monomers; the vinyl monomers include a vinyl aromatic compound and a vinyl cyanide compound; and the rubber latex which the particle size is enlarged has an average particle diameter of 2,800 to 5,000 Å. In this case, coagulation efficiency, productivity, and impact resistance may be improved.

As another example, the method of preparing an ABS graft copolymer may include a latex stabilization step of stabilizing the latex which the particle size is enlarged by adding a pH adjusting agent between the latex coagulation step and the second graft polymerization step.

Hereinafter, the method of preparing an ABS graft copolymer of the present invention will be described in detail stepwise.

First Graft Polymerization Step

In the first graft polymerization step, some of the total amount of vinyl monomers to be grafted to a rubber polymer is grafted to the rubber polymer before a polymer coagulant is added.

For example, in the first graft polymerization step, to prepare the ABS graft copolymer of the present invention, based on 100% by weight in total of a conjugated diene rubber latex and vinyl monomers to be added, 4 to 15% by weight of the vinyl monomers is grafted to 20 to 70% by weight of the conjugated diene rubber latex. Within this range, latex coagulation efficiency and productivity may be increased and impact resistance may be improved.

As a preferred example, in the first graft polymerization step, 4 to 10% by weight of the vinyl monomers is grafted to 30 to 67% by weight of the conjugated diene rubber latex. In this case, physical properties of a final product, such as gloss, may be excellent, and the impact resistance of the final product may be greatly improved.

As another example, in the first graft polymerization step, 4 to 8% by weight of the vinyl monomers is grafted to 47 to 65% by weight of the conjugated diene rubber latex. Within this range, physical properties of a final product, such as gloss and moldability, may be maintained at a high level, and the impact resistance of the final product may be greatly improved.

The vinyl monomers of the present invention include a vinyl aromatic compound and a vinyl cyanide compound. For example, the vinyl monomers may include 40 to 90% by weight of the vinyl aromatic compound and 10 to 60% by weight of the vinyl cyanide compound; or 60 to 80% by weight of the vinyl aromatic compound and 20 to 40% by weight of the vinyl cyanide compound. Within this range, physical properties of a final product, such as impact resistance, surface properties, thermal stability, and moldability, may be excellent.

For example, the vinyl aromatic compound includes styrene, α-methyl styrene, vinyltoluene, chlorostyrene, and the like. Preferably, the vinyl aromatic compound is styrene.

For example, the vinyl cyanide compound includes acrylonitrile, methacrylonitrile, and the like. Preferably, the vinyl cyanide compound is acrylonitrile.

In the first graft polymerization step, the conjugated diene rubber latex is used as a seed for preparation of a graft copolymer, and may have an average particle diameter of 800 to 1,500 Å or 800 to 1,300 Å. Within this range, graft polymerization efficiency may be excellent, and swelling of the rubber latex to a desired size may be easy.

As a preferred example, the conjugated diene rubber latex may have an average particle diameter of 900 to 1,200 Å. In this case, graft degree and productivity may be further increased.

In the present invention, the average particle diameter of a latex is measured by a dynamic laser light scattering method using a Nicomp 370HPL instrument, unless otherwise specified.

The conjugated diene rubber latex of the present invention is a rubber polymer dispersed in water in the form of particles, and the rubber polymer is a polymer of a conjugated diene compound. For example, the conjugated diene compound may be one or more selected from 1,3-butadiene, isoprene, chloroprene, and piperylene, and is preferably 1,3-butadiene. In this case, the impact resistance of a final product may be excellent.

In addition, in the first graft polymerization step, initiators commonly used in the art may be added. Preferably, one or more fat-soluble peroxides selected from cumene hydroperoxide, diisopropylbenzene hydroperoxide, tert-butyl hydroperoxide, paramethane hydroperoxide, and benzoyl peroxide are used as the initiators.

In addition, in the graft polymerization step, oxidation-reduction system polymerization initiators may be optionally added. For example, the oxidation-reduction system polymerization initiators may include one or more metal salts selected from iron(II), iron(III), cobalt(II), and cerium (IV); and one or more reducing agents selected from dextrose, glucose, fructose, dihydroxyacetone, and polyamine.

Latex Coagulation Step

In the latex coagulation step of the present invention, enlarging particle size of a rubber latex is performed by adding a coagulant to a reaction system after the first graft polymerization step.

In the present invention, the polymer coagulant is used to reduce coagulum content and improve productivity. For example, the polymer coagulant may be added in an amount of 1 to 4 parts by weight, 2 to 4 parts by weight, or 2 to 3 parts by weight based on 100 parts by weight in total of a conjugated diene rubber latex (based on solids) and vinyl monomers to be used in the reaction. Within this range, coagulation may be facilitated within a short time without increasing coagulum content.

In the coagulation step, when the polymer coagulant is added in an amount less than the above range, the particle size of the rubber latex may not be enlarged to a desired size due to insignificant coagulation effect. As a result, improvement in physical properties such as impact strength may be insignificant. In addition, when the polymer coagulant is added in an amount exceeding the above range, coagulum content may be increased due to excessive coagulation and an excess of the polymer coagulant may remain in the latex, thereby lowering impact strength. Consequently, an excess of water is used to rinse the coagulant after completion of graft polymerization, thereby increasing the amount of wastewater.

For example, the polymer coagulant of the present invention may be a copolymer prepared by polymerizing an unsaturated acid compound. Specifically, the polymer coagulant may be a copolymer prepared by polymerizing an unsaturated acid compound and monomers copolymerizable therewith.

The unsaturated acid compound chemically interacts with a rubber polymer dispersed in a latex stabilized with an emulsifier to lower latex stability, thereby allowing particle size of the rubber polymer to enlarge.

For example, the unsaturated acid compound may include one or more selected from (meth)acrylic acid, itaconic acid, itaconic anhydride, crotonic acid, crotonic anhydride, fumaric acid, maleic acid, maleic anhydride, citraconic acid, and citraconic anhydride.

The unsaturated acid compound preferably includes (meth)acrylic acid, more preferably methacrylic acid. In this case, coagulation efficiency may be excellent, and formation of coagulum may be reduced, thereby improving productivity.

As the monomers copolymerizable with the unsaturated acid compound, one or more selected from a (meth)acrylic acid alkyl ester, a vinyl aromatic compound, and a vinyl cyanide compound may be used. In this case, in terms of coagulation stability and reduction in coagulum content, a (meth)acrylic acid alkyl ester is preferably used.

For example, preferably, in the (meth)acrylic acid alkyl ester, an alkyl group having 1 to 20 carbon atoms is contained. As a specific example, the (meth)acrylic acid alkyl ester may include methyl (meth)acrylic acid, ethyl (meth)acrylic acid, propyl (meth)acrylic acid, n-butyl (meth) acrylic acid, isobutyl (meth)acrylic acid, tert-butyl (meth) acrylic acid, 2-ethyl hexyl (meth)acrylic acid, and the like, and preferably includes ethyl acrylic acid and n-butyl acrylic acid.

For example, the vinyl aromatic compound may include styrene, α-methyl styrene, vinyltoluene, chlorostyrene, and the like. The vinyl cyanide compound may include acrylonitrile, methacrylonitrile, and the like.

For example, the polymer coagulant may be a copolymer containing an unsaturated acid compound and having a core-shell structure. In this case, coagulum content may be further reduced, thereby improving productivity.

For example, the copolymer having a core-shell structure may include 30 to 55% by weight of a core and 45 to 70% by weight of a shell; or 40 to 55% by weight of a core and 45 to 60% by weight of a shell. In this case, coagulation efficiency may be further increased, and coagulum content may be reduced.

The shell includes an unsaturated acid compound. As described above, since coagulation occurs when the dispersion stability of a latex is disturbed by an unsaturated acid compound, the copolymer having a core-shell structure is prepared so that the unsaturated acid compound is included in the shell.

The shell may further include a (meth)acrylic acid alkyl ester.

As a specific example, the shell may include 10 to 20% by weight of an unsaturated acid compound and 80 to 90% by weight of a (meth)acrylic acid alkyl ester; 12 to 20% by weight of an unsaturated acid compound and 80 to 88% by weight of a (meth)acrylic acid alkyl ester; or 15 to 20% by weight of an unsaturated acid compound and 80 to 85% by weight of a (meth)acrylic acid alkyl ester. In this case, coagulation efficiency may be excellent.

The core may include a (meth)acrylic acid alkyl ester, and may optionally further include an unsaturated acid compound.

As a preferred example, the polymer coagulant may include 30 to 55% by weight of a core prepared by polymerizing 90 to 100% by weight of a (meth)acrylic acid alkyl ester and 0 to 10% by weight of an unsaturated acid compound; and 45 to 70% by weight of a shell surrounding the core and prepared by polymerizing 80 to 90% by weight of a (meth)acrylic acid alkyl ester and 10 to 20% by weight of an unsaturated acid compound. In this case, coagulation efficiency may be excellent, and productivity may be excellent due to low coagulum content.

For example, the polymer coagulant may have an average particle diameter of 800 to 1,500 Å or 800 to 1,300 Å. In this case, the latex may be uniformly size-enlarged without greatly increasing coagulum content.

In the latex coagulation step of the present invention, the latex which the particle size is enlarged may have an average particle diameter of 2,800 to 5,000 Å, 3,000 to 4,000 Å, or 3,000 to 3,500 Å. Within this range, appearance characteristics of a final product, such as gloss, and the impact resistance of a final product may be excellent.

Latex Stabilization Step

As described above, the latex which the particle size is enlarged is in a state wherein the dispersion stability is disturbed due to addition of the polymer coagulant. Preferably, after the particle size of the latex is enlarged to the desired size, the latex which the particle size is enlarged is stabilized, and then additional graft polymerization is performed.

In the latex stabilization step of the present invention, a pH adjusting agent is added to stabilize the latex which the particle size is enlarged. For example, the pH adjusting agent is preferably added 30 minutes after addition of the polymer coagulant. In this case, enlarging the particle size sufficiently proceeds to obtain a latex having a desired size.

For example, the pH adjusting agent may be potassium hydroxide or sodium hydroxide. When the pH adjusting agent is added, an aqueous solution containing 1 to 10% by weight of the pH adjusting agent may be prepared, and then added. This method may be more advantageous in terms of securing latex stability.

For example, the pH adjusting agent may be added in an amount of 0.01 to 1 part by weight or 0.1 to 0.5 parts by weight based on 100 parts by weight in total of a conjugated diene rubber latex (based on solids) and vinyl monomers to be used in the reaction. Within this range, since the latex which the particle size is enlarged is stably dispersed, the subsequent process may be facilitated, coagulum content may be reduced, and particle size distribution becomes narrow, thereby improving physical properties such as impact resistance.

Second Graft Polymerization Step

In the second graft polymerization step of the present invention, residual vinyl monomers are added to the size-enlarged latex and grafted to the size-enlarged latex.

For example, in the second graft polymerization step, to prepare the ABS graft copolymer of the present invention, vinyl monomers may be added in an amount of 25 to 75% by weight, 25 to 60% by weight, or 27 to 45% by weight based on 100% by weight in total of a conjugated diene rubber latex and the vinyl monomers. Within this range, reaction efficiency and the impact resistance of a final product may be excellent.

The vinyl monomers in the second graft polymerization step are the same as the vinyl monomers in the first graft polymerization step, and a repeated description thereof will be omitted.

After completion of the second graft polymerization, coagulation, dehydration, and drying may be performed using conventional methods to obtain an ABS graft copolymer in a powder form.

For example, the ABS graft copolymer latex may be coagulated using a metal salt coagulant, followed by aging, washing, dehydration, and drying to obtain a powder, without being limited thereto.

Examples of the metal salt coagulant may include magnesium sulfate, aluminum sulfate, calcium chloride, and calcium acetate.

In describing the method of preparing an ABS graft copolymer of the present invention, additives such as reaction media, emulsifiers, and catalysts and reaction conditions are not particularly limited as long as the additives and the reaction conditions are well known in the art to which the present invention pertains, and additives and reaction conditions may be suitably selected within the range usually practiced in the art.

The ABS graft copolymer prepared according to the present invention may be mixed with a matrix resin to prepare a thermoplastic resin composition, and a molding process may be performed to manufacture a molded article.

Hereinafter, the method of preparing a thermoplastic resin composition and manufacturing a molded article according to the present invention will be described.

For example, the method of preparing a thermoplastic resin composition according to the present invention may include kneading and extruding 20 to 80% by weight of the ABS graft copolymer prepared by the above method and 20 to % by weight of a non-graft resin. Within this range, moldability may be excellent, surface properties of a final product may be maintained at a high level, and the impact resistance of the final product may be greatly improved.

As another example, the method of preparing a thermoplastic resin composition may include kneading and extruding 20 to 40% by weight of the ABS graft copolymer prepared by the above method and 60 to 80% by weight of a non-graft resin. In this case, molding and processing may be facilitated, and impact resistance may be greatly improved.

The ABS graft copolymer is prepared by the method of preparing an ABS graft copolymer described above, and a repeated description thereof will be omitted.

For example, the non-graft resin may be a copolymer of a vinyl aromatic compound and a vinyl cyanide compound.

As a specific example, the non-graft resin may be a copolymer prepared by polymerizing 10 to 90% by weight of a vinyl aromatic compound and 10 to 90% by weight of a vinyl cyanide compound; or 60 to 90% by weight of a vinyl aromatic compound and 10 to 40% by weight of a vinyl cyanide compound. Within this range, processability and moldability of the composition may be excellent, without lowering physical properties of the ABS graft copolymer.

For example, examples of the vinyl aromatic compound may include styrene, α-methyl styrene, vinyltoluene, chlorostyrene, and the like, and examples of the vinyl cyanide compound may include acrylonitrile, methacrylonitrile, and the like.

As a preferred example, the non-graft resin may be a styrene-acrylonitrile copolymer. In this case, processability and moldability of the composition may be excellent, and physical properties of the composition may be improved.

For example, the non-graft resin may be prepared using emulsion polymerization or bulk polymerization, without being limited thereto. Preferably, the non-graft resin is prepared using continuous bulk polymerization in terms of reduction in preparation costs.

For example, the kneading and extruding may be performed at a temperature of 220 to 300° C. at a speed of 200 to 400 rpm; or at a temperature of 260 to 300° C. at a speed of 200 to 300 rpm, but the present invention is not limited to the above-mentioned conditions, and conditions may be suitably selected within the range usually practiced in the art.

For example, kneading and extruding may be performed using a Banbury mixer, a single screw extruder, a twin screw extruder, a kneader reactor, and the like, without being limited thereto.

During kneading, one or more additives of colorants, heat stabilizers, light stabilizers, reinforcing agents, fillers, flame retardants, lubricants, plasticizers, antistatic agents, and processing aids may be optionally added when necessary.

When impact strength (⅛", 23° C.) is measured according to ASTM D256, the composition has an impact strength of 30 kgcm/cm or more, 30 to 40 kgcm/cm, 30.5 to 40 kgcm/cm, or 32 to 40 kgcm/cm. Therefore, the composition may be suitable for thin film products requiring high impact resistance.

The thermoplastic resin composition prepared according to the present invention may be subjected to a molding process such as injection molding or blow molding to manufacture molded articles used in various fields.

The present invention provides a method of preparing a large-diameter rubber latex described below. The large-diameter rubber latex prepared by the method may be copolymerized with copolymerizable monomers and may be used as an impact modifier.

In describing the method of preparing a large-diameter rubber latex according to the present invention, the description of configuration overlapping with the method of preparing an ABS graft copolymer described above will be omitted.

For example, the method of preparing a large-diameter rubber latex according to the present invention may include performing graft polymerization by adding 6 to 25 parts by weight of vinyl compounds to 100 parts by weight (based on solids) of a conjugated diene rubber latex; and enlarging particle size of the rubber latex by adding 1 to 4 parts by weight of a polymer coagulant after performing graft polymerization. In this case, the vinyl compounds may include a vinyl aromatic compound and a vinyl cyanide compound, the rubber latex which the particle size is enlarged may have an average particle diameter of 2,800 to 5,000 Å or 3,000 to 4,000 Å, and coagulum content is 0.05% by weight or less or 0.03% by weight or less. In this case, impact reinforcement characteristics may be excellent.

For example, the vinyl compounds may be added in an amount of 6 to 25 parts by weight, 6 to 20 parts by weight, or 6 to 15 parts by weight based on 100 parts by weight (based on solids) of a conjugated diene rubber latex. Preferably, the vinyl compounds are added in an amount of 6 to 10 parts by weight. Within this range, impact reinforcement characteristics may be further improved while lowering coagulum content.

For example, the method of preparing a large-diameter rubber latex may further include stabilizing the latex which the particle size is enlarged by adding a pH adjusting agent after the enlarging particle size of a rubber latex. In this case, a size-enlarged rubber latex having a narrow particle size distribution and a uniform size may be obtained, thereby improving physical properties. In addition, due to low coagulum content, productivity may be excellent.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

PREPARATION EXAMPLES

Preparation Example 1: Preparation of Polymer Coagulant 208 parts by weight of distilled water and 0.75 parts by weight of dioctyl sulfosuccinate sodium (DOSS) as an emulsifier were added to a reactor and stirred while heating to 80° C. Then, 0.2 parts by weight of potassium persulfate (KPS) as an initiator and 50 parts by weight of butyl acrylate (BA) were added to the reactor and reaction was allowed to proceed for 90 minutes. Subsequently, 41 parts by weight of butyl acrylate and 9 parts by weight of methacrylic acid (MAA) were added and reaction was allowed to proceed. Finally, a polymer coagulant (weight ratio of core to shell is 50:50, core includes 50 parts by weight of BA, shell includes 41 parts by weight of BA and 9 parts by weight of MAA, and amount of functional monomers included in shell is 18% by weight) having an average particle diameter of 1,000 Å was obtained.

Preparation Example 2: Preparation of Small-Diameter Rubber Latex 100 parts by weight of 1,3-butadiene, 1 to 4 parts by weight of an emulsifier, 0.1 to 0.6 parts by weight of a polymerization initiator, 0.1 to 1 part by weight of an electrolyte, 0.1 to 0.5 parts by weight of a molecular weight modifier, and 90 to 130 parts by weight of deionized water were added batchwise and reacted at 50 to 65° C. for 7 to 12 hours. Then, 0.05 to 1.2 parts by weight of the molecular weight modifier was additionally added batchwise and reacted at 55 to 70° C. for 5 to 15 hours to obtain a small-diameter rubber latex.

Examples

Example 1

1. Preparation of ABS Graft Copolymer 60 parts by weight (based on solids) of a small-diameter rubber latex having an average particle diameter of 1,000 Å was added to a reactor and stirred while heating to 40 to 60° C. Then, grafting was performed by adding 3 parts by weight of styrene, 1 part by weight of acrylonitrile, and 0.01 to 0.1 parts by weight of an oxidation-reduction system polymerization initiator including 0.1 parts by weight of tert-butyl hydroperoxide (TBHP) as a fat-soluble peroxide initiator, iron($Fe^{2+}$), and dextrose to the reactor. 2.2 parts by weight of the polymer coagulant prepared in Preparation Example 1 was added and stirred for 30 minutes to enlarge a particle size of the latex. Subsequently, 0.3 parts by weight of potassium hydroxide was added. It was confirmed that the average particle diameter of the latex which the particle size is enlarged, was 3,020 Å. Next, 9 parts by weight of acrylonitrile and 27 parts by weight of styrene were added and grafted to the large-diameter rubber latex which the particle size is enlarged.

After completion of graft polymerization, the ABS graft copolymer latex was coagulated using magnesium sulfate (MgSO$_4$), and then washing, dehydration, and drying were performed to obtain ABS powder.

2. Preparation of Thermoplastic Resin Composition

The prepared ABS powder and a styrene-acrylonitrile (SAN) copolymer were mixed in a mixer so that the weight ratio of the ABS powder to the styrene-acrylonitrile copolymer is 23:77. Then, pellets were prepared using an extruder, and the pellets were injected using an injection molding machine to prepare specimens for measuring physical properties.

Example 2

1. Preparation of ABS Graft Copolymer

The same method and conditions as in Example 1 were used, except that 11.25 parts by weight of styrene and 3.75 parts by weight of acrylonitrile were added to perform partial grafting before a polymer coagulant is added, and 6.25 parts by weight of acrylonitrile and 18.75 parts by weight of styrene were added to a large-diameter rubber latex which a particle size is enlarged.

In this case, it was confirmed that the average particle diameter of the large-diameter latex which the particle size is enlarged, was 3,093 Å.

2. Preparation of Thermoplastic Resin Composition

Specimens for measuring physical properties were prepared using the same method as in Example 1, except that the ABS graft copolymer prepared in Example 2 was used.

Example 3

1. Preparation of ABS Graft Copolymer

The same method and conditions as in Example 1 were used, except that the amount of a polymer coagulant added was changed from 2.2 parts by weight (in the case of Example 1) to 3.3 parts by weight.

In this case, it was confirmed that the average particle diameter of a large-diameter latex which a particle size is enlarged, was 3,250 Å.

2. Preparation of Thermoplastic Resin Composition

Specimens for measuring physical properties were prepared using the same method as in Example 1, except that the ABS graft copolymer prepared in Example 3 was used.

Example 4

1. Preparation of ABS Graft Copolymer

The same method and conditions as in Example 1 were used, except that 7.5 parts by weight of styrene and 2.5 parts by weight of acrylonitrile were added to perform partial grafting before a polymer coagulant is added, and 7.5 parts by weight of acrylonitrile and 22.5 parts by weight of styrene were added to a large-diameter rubber latex which a particle size is enlarged.

In this case, it was confirmed that the average particle diameter of the large-diameter latex which the particle size is enlarged, was 3,091 Å.

2. Preparation of Thermoplastic Resin Composition

Specimens for measuring physical properties were prepared using the same method as in Example 1, except that the ABS graft copolymer prepared in Example 4 was used.

Comparative Example 1

1. Preparation of ABS Graft Copolymer 60 parts by weight (based on solids) of a small-diameter rubber latex having an average particle diameter of 1,000 Å was added to a reactor and stirred while heating to 40 to 60° C. Then, 2.2 parts by weight of a polymer coagulant was added and stirred for 30 minutes to enlarge a particle size of the small-diameter rubber latex. Subsequently, 0.3 parts by weight of potassium hydroxide was added. In this case, it was confirmed that the average particle diameter of the large-diameter rubber latex which the particle size is enlarged, was 2,760 Å. Next, grafting was performed by adding 10 parts by weight of acrylonitrile and 30 parts by weight of styrene to the large-diameter rubber latex which the particle size is enlarged.

After completion of graft polymerization, ABS powder was obtained using the same method as in Example 1.

2. Preparation of Thermoplastic Resin Composition

Specimens for measuring physical properties were prepared using the same method as in Example 1, except that the ABS graft copolymer prepared in Comparative Example 1 was used.

Comparative Example 2

1. Preparation of ABS Graft Copolymer

The same method and conditions as in Example 1 were used, except that the amount of a polymer coagulant added was changed from 2.2 parts by weight (in the case of Example 1) to 0.5 parts by weight.

In this case, it was confirmed that the average particle diameter of the large-diameter latex which a particle size is enlarged, was 1,950 Å.

2. Preparation of Thermoplastic Resin Composition

Specimens for measuring physical properties were prepared using the same method as in Example 1, except that the ABS graft copolymer prepared in Comparative Example 2 was used.

Comparative Example 3

1. Preparation of ABS Graft Copolymer

The same method and conditions as in Example 1 were used, except that the amount of a polymer coagulant added was changed from 2.2 parts by weight (in the case of Example 1) to 4.4 parts by weight.

In this case, it was confirmed that the average particle diameter of the large-diameter latex which a particle size is enlarged, was 3,310 Å.

2. Preparation of Thermoplastic Resin Composition

Specimens for measuring physical properties were prepared using the same method as in Example 1, except that the ABS graft copolymer prepared in Comparative Example 3 was used.

Comparative Example 4

1. Preparation of ABS Graft Copolymer

The same method and conditions as in Example 1 were used, except that 1 to 2 parts by weight of acetic acid instead of a polymer coagulant was added.

In this case, it was confirmed that the average particle diameter of the large-diameter latex which a particle size is enlarged, was 3,100 Å.

Comparative Example 5

1. Preparation of ABS Graft Copolymer

The same method and conditions as in Example 1 were used, except that addition of potassium hydroxide was omitted.

In this case, it was confirmed that the average particle diameter of the large-diameter latex which a particle size is enlarged, was 3,556 Å.

When graft polymerization was performed without addition of potassium hydroxide as described above, it was confirmed that the average particle diameter of a latex was very large, and particle size distribution was considerably wide. In addition, since pH was low, grafting conversion rate was as low as 67%, and a large amount of coagulum was generated. Thus, additional physical properties were not evaluated.

Comparative Example 6

1. Preparation of ABS Graft Copolymer

The same method and conditions as in Example 1 were used, except that a polymer coagulant including a core and a shell in a weight ratio of 10:90 was added.

In this case, it was confirmed that the average particle diameter of the large-diameter latex which a particle size is enlarged, was 2,879 Å.

Comparative Example 7

1. Preparation of ABS Graft Copolymer

The same method and conditions as in Example 1 were used, except that a polymer coagulant including a core and a shell in a weight ratio of 60:40 was added.

In this case, it was confirmed that the average particle diameter of the large-diameter latex which a particle size is enlarged, was 2,806 Å.

Test Example

Properties of the large-diameter rubber latex and the injection specimen prepared in Examples and Comparative Examples were measured by the following methods, and the obtained results are shown in Table 1 and FIGS. 1 and 2.

FIG. 1 is a graph showing changes in impact strength depending on the contents (B/M) of vinyl monomers, which are grafted to a rubber polymer before addition of a polymer coagulant, and FIG. 2 is a graph showing the impact strength (IMP) and average particle diameter (P/S) of a rubber latex which the particle size is enlarged, depending on the amount of a polymer coagulant added.

- Izod impact strength (IMP): The Izod impact strength of each of a ¼"-thickness (6.4 mm) specimen and a ⅛"-thickness (3.2 mm) specimen was measured at room temperature (23° C.) according to ASTM D256.
- Gloss: The gloss of a ¼"-thickness (6.4 mm) specimen was measured at an angle of 45° according to ASTM D523.
- Average particle diameter of latex: The average particle diameter of rubber in a latex was measured by a dynamic laser light scattering method using a Nicomp 370HPL instrument.
- Coagulum content in latex: A swollen large-diameter rubber latex was filtered using a 60-mesh wire mesh, and the unfiltered coagulum was dried and weighed. The relative amount of coagulum with respect to total solids content was calculated as a percentage.

TABLE 1

| Classification | Examples | | | | Comparative Examples | | | | | | |
| --- | --- | --- | --- | --- | --- | --- | --- | --- | --- | --- | --- |
| | 1 | 2 | 3 | 4 | 1 | 2 | 3 | 4 | 5 | 6 | 7 |
| Average particle diameter of rubber [Å] | 3,020 | 3,093 | 3,250 | 3,091 | 2,760 | 1,950 | 3,310 | 3,100 | 3,556 | 2,879 | 2,806 |
| Coagulum content [% by weight] | 0.01 | 0.03 | 0.02 | 0.01 | 0.04 | 0.05 | 0.05 | 0.3 | 0.8 | 0.04 | 0.13 |
| Impact strength of ¼" specimen [kgcm/cm] | 24.6 | 22.9 | 23.5 | 24.0 | 19.5 | 11.5 | 19.7 | 22.1 | — | 17.9 | 18.8 |
| Impact strength of ⅛" specimen [kgcm/cm] | 33.0 | 30.5 | 30.1 | 32.8 | 23.5 | 10.7 | 20.7 | 29.0 | — | 23.0 | 22.1 |
| Gloss | 102.5 | 102.6 | 102.1 | 102.3 | 102.8 | 102.0 | 100.4 | 100.0 | — | 102.5 | 101.5 |

Referring to Table 1 and FIGS. 1 and 2, in the case of Examples 1 to 4 according to the present invention, in which a predetermined amount of styrene and a predetermined amount of acrylonitrile were added and grafted before enlarging particle size of a small-diameter rubber latex was performed, and then a certain amount of a polymer coagulant was added, it can be confirmed that the particle size of the rubber latex is enlarged to a proper size and coagulum content is low. In particular, as shown in Table 1, comparing the results of Examples 1 to 3, it can be confirmed that, when all other conditions are equal, when 4 to 10 parts by weight of styrene and acrylonitrile is added before coagulation, physical properties are improved. In Example 1, in which 4 parts by weight of styrene and acrylonitrile was added, it can be confirmed that physical properties such as latex stability and impact strength are further improved.

In addition, in the case of Examples 1 to 4, as compared with Comparative Example 1, in which styrene and acrylonitrile were grafted after enlarging particle size of a small-diameter rubber latex was performed as in the conventional method, impact strength was greatly improved while having the same level of gloss as Comparative Example 1. In particular, the impact strength of a 1/8" specimen was greatly improved.

In addition, referring to the experimental results of Comparative Examples 2 and 3, even when styrene and acrylonitrile were added and grafted, and then a polymer coagulant was added under the same conditions as in Example 4, when a polymer coagulant was added in a small amount (Comparative Example 2), enlarging particle size was not sufficiently progressed. As a result, the particle diameter of rubber was small, and impact strength was significantly lowered. On the contrary, when an excess of a polymer coagulant was added (Comparative Example 3), the particle diameter of rubber was large, but impact strength and gloss were lowered. These results may be attributed to the fact that an excess of a polymer coagulant remains in a latex.

In addition, when acetic acid instead of a polymer coagulant was added to enlarge particle size of latex (Comparative Example 4), the average particle diameter was as large as 3000 Å or more, but coagulum content was significantly increased compared with Example 4.

In addition, referring to the results of Comparative Example 5, when a stabilization step of stabilizing the latex which a particle size is enlarged by adding potassium hydroxide was omitted, a considerably large amount of coagulum was generated. In addition, the average particle diameter was significantly increased, but the particle size distribution was quite wide and grafting efficiency was very low due to low pH of latex.

In addition, referring to Table 1, when a polymer coagulant including a core and a shell in a weight ratio of 10:90 was used (Comparative Example 6), even when graft polymerization and particle size enlargement were performed under the same conditions as in Example 4, the average particle diameter was somewhat smaller than in Example 4, and impact strength was not improved. When a polymer coagulant including a core and a shell in a weight ratio of 60:40 was used (Comparative Example 7), the average particle diameter was somewhat smaller than in Example 4, an excess of coagulum was generated, and impact strength was not improved.

The invention claimed is:
1. A method of preparing an ABS graft copolymer, comprising:
a first graft polymerization step of grafting 4 to 15% by weight of vinyl monomers to 20 to 70% by weight of a conjugated diene rubber latex;
a latex coagulation step of enlarging particle size of the rubber latex by adding a polymer coagulant after the first graft polymerization step;
a latex stabilization step of stabilizing the rubber latex having the enlarged particle size by adding a pH adjusting agent after the latex coagulation step; and
a second graft polymerization step of grafting 25 to 75% by weight of the vinyl monomers to the rubber latex having the enlarged particle size, after the latex stabilization step,
wherein the polymer coagulant is added in an amount of 1 to 4 parts by weight based on 100 parts by weight in total of the conjugated diene rubber latex and the vinyl monomers;
the vinyl monomers comprise a vinyl aromatic compound and a vinyl cyanide compound; and
the rubber latex which the particle size is enlarged has an average particle diameter of 2,800 to 5,000 Å.

2. The method according to claim 1, wherein the polymer coagulant is a copolymer prepared by polymerizing an unsaturated acid compound.

3. The method according to claim 1, wherein the polymer coagulant is a copolymer having a core-shell structure.

4. The method according to claim 3, wherein the copolymer having a core-shell structure comprises 30 to 55% by weight of a core and 45 to 70% by weight of a shell.

5. The method according to claim 3, wherein the shell comprises an unsaturated acid compound.

6. The method according to claim 5, wherein the shell comprises 10 to 20% by weight of an unsaturated acid compound and 80 to 90% by weight of a (meth)acrylic acid alkyl ester.

7. The method according to claim 3, wherein the core comprises a (meth)acrylic acid alkyl ester.

8. The method according to claim 7, wherein the core further comprises an unsaturated acid compound.

9. The method according to claim 3, wherein the polymer coagulant comprises 30 to 55% by weight of a core prepared by polymerizing 90 to 100% by weight of a (meth)acrylic acid alkyl ester and 0 to 10% by weight of an unsaturated acid compound; and 45 to 70% by weight of a shell surrounding the core and prepared by polymerizing 80 to 90% by weight of a (meth)acrylic acid alkyl ester and 10 to 20% by weight of an unsaturated acid compound.

10. The method according to claim 1, wherein the polymer coagulant has an average particle diameter of 800 to 1,500 Å.

11. The method according to claim 1, wherein the conjugated diene rubber latex has an average particle diameter of 800 to 1,500 Å.

12. A method of preparing a thermoplastic resin composition, comprising performing the method according to claim 1 to prepare the ABS graft copolymer; and
kneading and extruding 20 to 80% by weight of the ABS graft copolymer and 20 to 80% by weight of a non-graft resin.

* * * * *